(12) United States Patent
Omeis et al.

(10) Patent No.: US 8,445,566 B2
(45) Date of Patent: May 21, 2013

(54) CONTINUOUS PROCESS FOR PRODUCING A REACTIVE POLYMER

(75) Inventors: Marianne Omeis, Dorsten (DE); Thomas Weihrauch, Duelmen (DE); Frank Bauer, Iserlohn (DE); Elke Fiebig-Bauer, legal representative, Iserlohn (DE); Silvia Herda, Herne (DE)

(73) Assignee: Evonik Degussa GmbH, Essen (DE)

( * ) Notice: Subject to any disclaimer, the term of this patent is extended or adjusted under 35 U.S.C. 154(b) by 72 days.

(21) Appl. No.: 12/990,421

(22) PCT Filed: Apr. 2, 2009

(86) PCT No.: PCT/EP2009/053917
§ 371 (c)(1),
(2), (4) Date: Mar. 7, 2011

(87) PCT Pub. No.: WO2009/132923
PCT Pub. Date: Nov. 5, 2009

(65) Prior Publication Data
US 2011/0207861 A1    Aug. 25, 2011

(30) Foreign Application Priority Data
Apr. 30, 2008   (DE) .................. 10 2008 001 470

(51) Int. Cl.
| | | |
|---|---|---|
| C08K 5/24 | (2006.01) | |
| C08K 5/3492 | (2006.01) | |
| C08K 5/34 | (2006.01) | |
| C08K 5/35 | (2006.01) | |
| C08K 5/13 | (2006.01) | |
| C08G 65/48 | (2006.01) | |

(52) U.S. Cl.
USPC ............. 524/96; 524/97; 524/99; 524/100; 524/102; 524/261; 524/323; 524/325; 525/474; 525/534

(58) Field of Classification Search
USPC ............. 524/96, 97, 99, 100, 102, 261, 323, 524/325; 525/474, 534
See application file for complete search history.

(56) References Cited

U.S. PATENT DOCUMENTS

| | | |
|---|---|---|
| 4,699,970 A | 10/1987 | Tiba et al. |
| 4,806,267 A | 2/1989 | Culbertson et al. |
| 5,302,687 A | 4/1994 | Culbertson et al. |
| 5,616,659 A | 4/1997 | Deviney et al. |
| 5,644,006 A | 7/1997 | Deviney et al. |
| 6,515,044 B1 | 2/2003 | Idel et al. |
| 2008/0207838 A1 | 8/2008 | Omeis et al. |
| 2010/0076186 A1 | 3/2010 | Kuebelbaeck et al. |

FOREIGN PATENT DOCUMENTS

| | | |
|---|---|---|
| DE | 198 42 152 | 3/2000 |
| EP | 0 284 880 | 10/1988 |
| EP | 0 758 351 | 10/1998 |
| EP | 1 964 663 | 9/2008 |
| WO | 98 05699 | 2/1998 |
| WO | WO 2010/034562 A1 | 4/2010 |

OTHER PUBLICATIONS

Boulter, E.A., et al., "High-Service Temperature Polyether Amide Thermoset Resins—New Materials for Electrical Insulation and High Strength Composites," Electrical Insulation Conference, Electrical Manufacturing & Coil Wilding Conference Proceedings, vol. 22-25, pp. 249-253, (Sep. 1997).
"New Cost Competitive Thermoset Resins for Advanced Composite Applications have Properties Superior or Equal to High Performance Epoxies," Mat Tech, vol. 11, No. 6, pp. 215-229, (1996).
Culbertson, B.M., et al., "Cyclic imino ethers in step-growth polymerizations," Progress in Polymer Science, vol. 27, pp. 579-626, (2002).
International Search Report issued Jun. 23, 2009 in PCT/EP09/053917 filed Apr. 2, 2009.
U.S. Appl. No. 12/990,371, filed Oct. 29, 2010, Omeis, et al.
Written Opinion issued Apr. 5, 2012 in Singapore Patent Application No. 201007692-5 filed Apr. 2, 2009.
Edith A. Turi, "Thermal Characterization of Polymeric Materials" Academic Press, 1981, 3 pages.

*Primary Examiner* — Kriellion Sanders
(74) *Attorney, Agent, or Firm* — Oblon, Spivak, McClelland, Maier & Neustadt, L.L.P.

(57) ABSTRACT

The invention relates to a continuous process for producing a reactive polymer based on compounds according to the structures (A1) and/or (A2) and phenolic resin in an extruder and to the reactive polymer produced according to said process and the use thereof for producing composite materials.

20 Claims, No Drawings

CONTINUOUS PROCESS FOR PRODUCING A REACTIVE POLYMER

The present invention describes a reactive polymer, a continuous process for preparing it and the use of this reactive polymer for producing materials.

In Electrical Insulation Conference, 1997, and Electrical Manufacturing & Coil Winding Conference Proceedings, volume 22-25 (September 1997), pages 249-253, E. A. Boulter et al. describe the properties of oxazoline-modified phenolic resins, for example the adhesion to carbon fibres, glass fibres and metals, the resistance to thermal oxidative degradation, the low smoke development in the case of fire, the low flammability and the high impact toughness. Particularly as a result of the low flammability, these polymers are suitable for producing components for the aircraft industry. Further applications are in the field of electric insulation and in the electronics sector. According to E. A. Boulter, these precursors or prepolymers are also suitable, inter alia, for injection moulding, resin transfer moulding (RTM) and prepregs.

A batch process for preparing oxazoline-modified phenolic resins is described by Tiba et al. in U.S. Pat. No. 4,699,970. Here, oxazolines and phenolic resins are reacted in the presence of phosphites as catalysts and are subsequently cured. The use of phosphines as catalysts is described by Goel et al. in EP 0 284 880 A2.

A further batch process for preparing oxazoline-modified phenolic resins is described by Culbertson et al. in U.S. Pat. No. 5,302,687. Catalysts described here are tetraalkylammonium and tetraarylammonium salts and tetraalkylphosphonium and tetraarylphosphonium salts, with alkyl halides being used as cocatalysts.

In U.S. Pat. No. 4,806,267, Culbertson et al. likewise describe a process for preparing a low-melting mixture (a melting point of less than 100° C.) comprising aromatic bisoxazolines and bisoxazines, with the structural unit of the oxazolines or oxazines being present in a molecule. In U.S. Pat. No. 5,644,006, Deviney et al. describe the reaction of a phenolic resin with modified bisoxazolines.

In Prog. Polym. Sci. 27 (2002) 579-626, Culbertson describes the stepwise polymerization of cyclic imino ethers, including the reaction of oxazolines with phenol-containing compounds. Here too, a batch process is described.

The properties of polymers prepared from bisoxazolines and phenolic resins are described in the publication Mat. Tech. 11.6:215-229.

EP 0 758 351 B1 describes compositions which can be polymerized by means of energy, homopolymers and copolymers of oxazolines, which comprise an organometallic compound as initiator. These compositions can preferably comprise phenolic compounds having two or more phenolic hydroxyl groups.

In U.S. Pat. No. 5,616,659, Deviney et al. describe a novolak crosslinked by bisoxazolines, where phosphoric ester groups are bound to the polymer chain in order to improve the flame resistance of the polymer.

To increase the thermal oxidative stability, Deviney et al. describe, in WO 98/05699, the preparation of a polymer from a phenolic resin and bisoxazolines in the absence of a catalyst. To achieve uniform introduction of energy into the composition comprising phenolic resin and bisoxazoline, the composition is exposed to an electromagnetic field.

The prior art describes processes for preparing reactive polymers based on oxazolines or oxazines and phenolic resins in a batch process; in particular, processes on a laboratory scale are described. To be able to drain the desired polymer product comprising bisoxazolines and phenolic resin from the reactor in industrially relevant production quantities, the temperature in the reactor can be increased or a suitable solvent is added. This procedure is frequently necessary since the reaction product of oxazolines or oxazines and phenolic resins can have a high viscosity. However, increasing the temperature can in the case of industrially relevant production quantities lead to partial polymerization of the phenolic resin.

It was therefore an object of the present invention to provide a continuous process for preparing reactive polymers based on oxazolines and phenolic resin.

We have surprisingly found a continuous process for preparing reactive polymers, which is characterized in that the reactive polymer is prepared by means of an extruder by reacting a mixture (A) comprising compounds having the structure (A1) and/or compounds having the structure (A2) with phenolic resins (B). After heat treatment of the reactive polymer prepared in this way, polymers which can have a glass transition temperature above 190° C. are obtained. Furthermore, this process according to the invention makes continuous preparation of these reactive polymers with a constant product quality possible.

The invention accordingly provides a process for the continuous preparation of reactive polymers by reaction of a mixture (A) comprising
one or more compounds having the structure (A1)

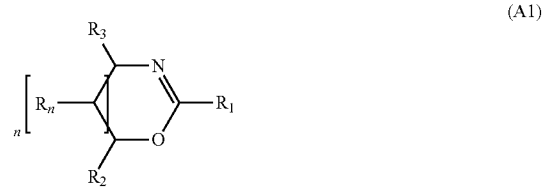

(A1)

where
$R_1$=alkyl or phenyl group,
$R_2, R_3, R_n$=hydrogen, alkyl group,
n=0, 1, 2, 3,
or
one or more compounds having the structure (A2)

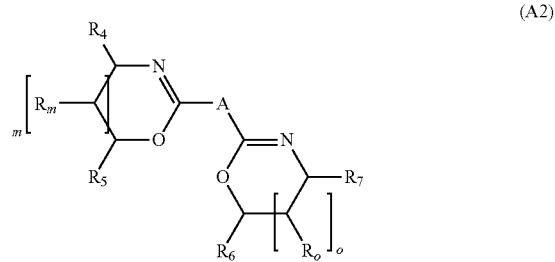

(A2)

where
A=alkylene or phenylene,
$R_4, R_5, R_6, R_7, R_m, R_o$=hydrogen, alkyl group,
m, o=0, 1, 2, 3,
or mixtures of one or more compounds having the structure (A1) and (A2),
where the substituents of the type $R_1, R_2, R_3, R_4, R_5, R_6, R_7, R_n, R_m$ and $R_o$ can be identical or different and substituted or unsubstituted, the structural fragment A can be substituted or unsubstituted and m and o can be identical or different, with phenolic resins (B), which is characterized in that the reaction is carried out in an extruder, flow tube, intensive kneader, intensive mixer or static mixer by mixing and quick reaction with introduction of heat and subsequent isolation of the end product, with the residence time of the starting materials in the extruder, flow tube, intensive kneader, intensive mixer or static mixer being from 3 seconds to 15 minutes.

The present invention further provides a reactive polymer which is characterized in that this reactive polymer comprises
I. a phenolic resin (B),
II. a mixture (A) comprising compounds having the structure (A1) and/or compounds having the structure (A2) and
III. the reaction product of the compounds having the structure (A1) and/or (A2) and the phenolic resin (B),
with the reactive polymer containing at least 5% by weight of chemically unbound compounds having the structure (A1) and/or (A2), based on the reactive polymer.

The invention also provides for the use of the reactive polymer for producing materials.

The principle of this process according to the invention is that the reaction of the starting materials, for example the mixture (A) and the phenolic resin (B), occurs continuously in an extruder, flow tube, intensive kneader, intensive mixer or static mixer by intensive mixing and quick reaction, preferably with the introduction of heat. A continuous after-reaction can follow if desired. Subsequent, preferably rapid, cooling enables the end product to be obtained. For the purpose of the present invention, rapid cooling means that the temperature decreases by more than 50° C. within less than 60 seconds. The melt is discharged at, for example, an exit temperature of 120° C. via, for example, a water- or air-cooled metal band. This cooling band preferably has a temperature of from 0 to 23° C., more preferably room temperature. The rapid cooling has the advantage that after-reactions in the polymer melt are suppressed thereby and, in addition, granulation is possible.

Apparatuses which are particularly suitable for the process of the invention and are preferably used are extruders such as single-screw or multiscrew extruders, in particular twin-screw extruders, planetary gear extruders or ring extruders, flow tubes, intensive kneaders, intensive mixers such as Turrax mixers or static mixers. In a particular embodiment of the process of the invention, it is also possible to use multishaft extruders, for example ring extruders. Particular preference is given to multiscrew extruders, in particular twin-screw extruders, and multishaft extruders, in particular ring extruders. Very particular preference is given to twin-screw extruders.

It is surprising that the reaction which in the batch process requires up to an hour proceeds in a few seconds in the abovementioned apparatuses, for example in an extruder or intensive kneader. The brief thermal stress in combination with the mixing action of the extruder is sufficient to react the reactants completely or very largely to the desired degree in the process of the invention. The extruders or intensive kneaders allow, by means of suitable fitting-out of the mixing chambers or configuration of the screw geometries, intensive rapid mixing with simultaneous intensive heat exchange. On the other hand, uniform flow in the longitudinal direction with a very uniform residence time is also ensured. In addition, it is advantageous for different temperatures to be able to be maintained in the individual barrels or sections of the apparatuses.

Further advantages of the process of the invention are not only the good mixing by means of the extruder but also precise metering of the components and the ability for the reaction time to be set precisely. In this way, a reactive polymer which is significantly simpler to work up than the products according to the prior art is obtained. Furthermore, the process of the invention is an economically attractive process, among other things because it is a continuous process in which the process parameters can be defined precisely. A scale-up process should therefore be relatively simple compared to the processes of the prior art.

The reactive polymer prepared by means of the process of the invention can be processed in a simple manner to give a granular material which can be handled readily in industry and also has good homogeneity. A further advantage is the rapid curing of the reactive polymer of the invention. This reactive polymer is particularly suitable for producing materials which have a high heat distortion resistance, a glass transition temperature above 190° C. and extraordinary impact properties. The reactive polymer of the invention can be used both for producing commodity components and also for producing high-performance fibre composites. Thus, the materials produced from the reactive polymer of the invention display a high toughness and resilience, improved electrical properties and a low to nonexistent liberation of reaction products, especially compared to the phenolic resin materials of the prior art. Furthermore, these materials have good properties in respect of the International "Fire, Smoke and Toxicity" (FST) regulations.

The starting materials are generally fed into the apparatuses in separate feed streams. In the case of more than two feed streams, these can also be introduced in combination. Hydroxyl-containing amorphous and/or crystalline polymers can be combined to form one feed stream. It is also possible to add catalysts and/or additives such as leveling agents, stabilizers, flame retardants, deaerators or bonding agents to this feed stream. These streams can also be divided and introduced in different proportions at various points on the apparatuses. In this way, it is possible for concentration gradients to be set in a targeted manner, as a result of which the reaction can be brought to completion. The order of the entry points for the feed streams can be varied and offset in time.

To carry out the prereaction and/or to complete the reaction, a plurality of apparatuses can also be combined.

The cooling which follows the reaction is, as described above, preferably carried out quickly and can be integrated into the reaction section in the form of a multibarrel design as in the case of extruders or Conterna machines. Use can also be made of: shell-and-tube apparatuses, coiled tubes, cooling rollers, pneumatic conveyers and conveyor belts made of metal.

Conversion into the finished product form can, depending on the viscosity of the reactive polymer leaving the apparatus or the after-reaction zone, start with further cooling by means of appropriate abovementioned equipment to a suitable temperature. This is preferably followed by pelletization or else comminution to a desired particle size by means of crushing rollers, a pin mill, hammer mill, flaking rollers or the like.

Intensive mixing and quick reaction with the introduction of heat means that the residence time of the starting materials in the abovementioned apparatuses is usually from 3 seconds to 15 minutes, preferably from 3 seconds to 5 minutes, particularly preferably from 5 to 180 seconds. The reactants are preferably reacted at temperatures of from 100° C. to 275° C., preferably from 150° C. to 200° C., very particularly preferably from 170° C. to 190° C. However, depending on the type of starting materials and the end products, these values for residence time and temperature can also have other preferred ranges.

An important constituent of the reactive polymer of the invention is the compounds of the structure (A1) and (A2), which can be used either alone or in the form of a mixture. Of course, it is also possible to use mixtures of various compounds of the structure (A1) or (A2). The substituents $R_1$ to $R_7$ and $R_n$, to $R_o$ encompass hydrogen and/or alkyl groups, with alkyl groups being, for the purposes of the present invention, linear or branched, aliphatic or cycloaliphatic groups having from 1 to 6 carbon atoms. The alkyl groups are preferably linear aliphatic groups having from 1 to 6 carbon atoms, in particular methyl, ethyl, propyl, butyl groups.

In the process of the invention, preference is given to using compounds having the structures (A1) and/or (A2) in which the substituents of the type $R_1$, $R_2$, $R_3$, $R_4$, $R_5$, $R_6$, $R_7$, $R_n$, $R_m$ and $R_o$ are hydrogen and/or unsubstituted alkyl groups having from 1 to 6 carbon atoms and the structural fragment A is unsubstituted alkylene having from 1 to 6 carbon atoms or unsubstituted phenylene in the mixture (A). Compounds having the structures (A1) and/or (A2) in which n, m, o=0 or 1 are preferably used. An example of the abovementioned compounds (A1) is 2-ethyl-2-oxazoline.

In a preferred embodiment of the process of the invention, a mixture (A) consisting of 100% by weight of one or more compounds having the structure (A2) in which m and o are preferably 0 or 1 is used. In particular, use is made of compounds having the structure (A2) and having a phenylene group as structural fragment A, for example 1,3-phenylenebisoxazoline or 1,4-phenylenebisoxazoline. To set the properties of the reactive polymer in a targeted manner, it is possible to use a mixture (A) comprising compounds having the structure (A2) in which m≠o within the same compound (A2u) and/or compounds having the structure (A2) in which m=o within the same compound (A2g). Thus, for example, compounds in which m=1 and o=0 within the same compound (A2g) can be used as mixture (A).

However, it is particularly advantageous in the process of the invention to use a mixture (A) which comprises both compounds having the structure (A2) in which m and o=1 within the same compound (A2g6) and compounds having the structure (A2) in which m and o=0 within the same compound (A2g5). In this way, the properties of the resulting reactive polymer, for example the viscosity, the reactivity and the melting point, can be controlled in the process of the invention. Examples of the abovementioned compounds of the structure (A2) are 1,3-phenylenebisoxazoline and 1,4-phenylenebisoxazoline.

As compounds of the structure (A2g5), preference is given to using 1,3-phenylenebisoxazoline or 1,4-phenylenebisoxazoline.

In the process of the invention, preference is given to using a mixture (A) comprising
from 10 to 90% by weight of compounds of the structure (A2g6) and
from 90 to 10% by weight of compounds of the structure (A2g5),
particularly preferably
from 30 to 70% by weight of compounds of the structure (A2g6) and
from 70 to 30% by weight of compounds of the structure (A2g5)
and very particularly preferably
from 45 to 55% by weight of compounds of the structure (A2g6) and
from 55 to 45% by weight of compounds of the structure (A2g5).

In the process of the invention, preference is given to using phenolic resins (B) obtained by condensation of phenols with aldehydes, in particular formaldehyde. Thus, phenolic resins selected from the novolak and/or resol type can be used in this process. Particular preference is given to using novolaks as phenolic resin (B). The phenolic resins (B) used preferably have a content of free formaldehyde of less than 0.1% by weight (determined in accordance with DIN EN 120). This has the advantage that no emissions of formaldehyde occur.

In the process of the invention, the mixture (A) and the phenolic resin (B) are preferably used in a weight ratio of mixture (A) to phenolic resin (B) of preferably from 99:1 to 1:99, more preferably from 90:10 to 10:90, particularly preferably from 75:25 to 25:75 and very particularly preferably from 45:55 to 55:45.

It is possible to use either Lewis acids or Lewis bases as catalyst in the process of the invention, with preference being given to using trialkyl or triaryl phosphites, more preferably triphenyl phosphite.

In a particular embodiment of the process of the invention, it is also possible to use tetraalkylphosphonium or tetraarylphosphonium salts, tetraalkylammonium or tetraarylammonium salts of halides, tetrafluoroborate, hexafluorophosphate or para-toluene-sulphonic acid as catalyst.

In the process of the invention, the catalyst is preferably used in an amount of from 0 to 2% by weight, based on the starting materials mixture (A) and phenolic resin (B), preferably in an amount of from 0.01 to 1% by weight and particularly preferably in an amount of from 0.01 to 0.4% by weight.

Depending on the use of the reactive polymer, it can be advantageous to carry out the process of the invention without use of a catalyst. This is advisable particularly in the case of uses of the reactive polymer in which the loss in mass of the resulting material during a thermal treatment should be as low as possible.

In the process of the invention, it is possible to add antioxidants in addition to the catalyst, preferably in the apparatus used for the process, for example in the extruder. As antioxidants, preference is given to using sterically hindered phenols, preferably compounds having the structure (3),

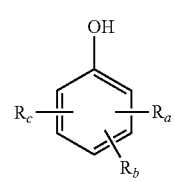

(3)

where $R_a$, $R_b$, $R_c$=hydrogen, alkyl, alkylaryl or cycloalkyl group,
where the substituents of the type $R_a$, $R_b$, $R_c$ can be identical or different and substituted or unsubstituted,
for example the reaction product of 4-methylphenol with dicyclopentadiene and isobutene having the structure (4),

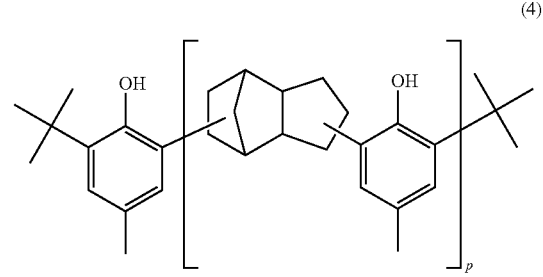

(4)

where p=1 to 5.

The antioxidants are preferably used in an amount of from 0.1 to 2% by weight, preferably from 0.2 to 1.5% by weight and particularly preferably from 0.3 to 1.2% by weight, based on the starting materials mixture (A) and phenolic resin (B), in the process of the invention.

Stabilizers can also be used in the process of the invention, with preference being given to using HALSs (hindered amine light stabilizers). Addition of a mixture of various HALSs is also possible. The addition of stabilizers can improve the long-term stability of the resulting reactive polymer.

Preference is given to using derivatives of 2,2,6,6-tetramethylpiperidin-4-one as stabilizer in the process of the invention. Derivatives of 2,2,6,6-tetramethylpiperidin-4-one for the purposes of the present invention are preferably compounds having the structure (5)

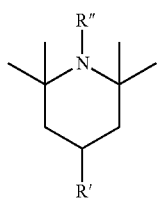

(5)

where R'=alkoxy group,

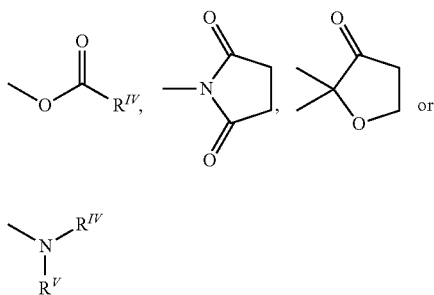

and
R"=free oxygen radical (—O•), hydrogen, alkyl or alkoxy group,

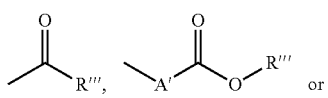

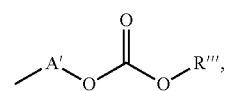

where R''' and $R^{IV}$=alkyl group, $R^{V}$=heterocycle and A'=alkylene group and the alkyl, alkoxy, alkylene groups and heterocycles are substituted or unsubstituted.

Particular preference is given to using stabilizers having the following structures (6) to (8):

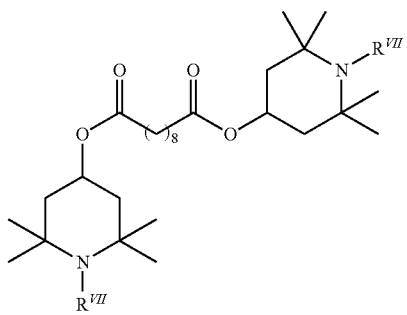

(6)

where $R^{VII}$=hydrogen, alkyl or alkoxy group,

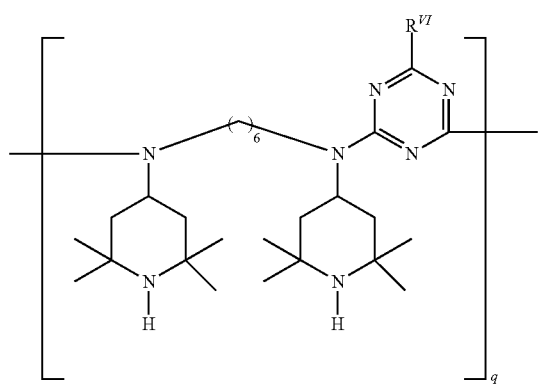

(7)

where $R^{VI}$=

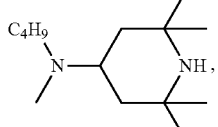

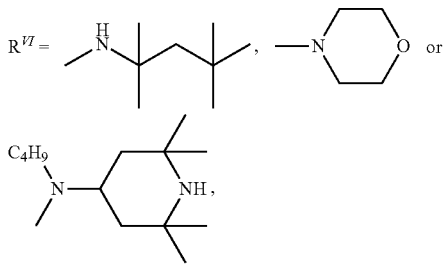

q=2 to 10,
or

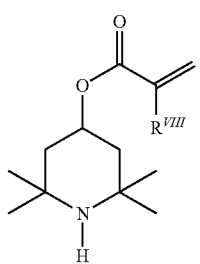

(8)

where $R^{VIII}$=hydrogen or alkyl group,
in the process of the invention.

In a further embodiment of the process of the invention, polymer-bound HALSs such as

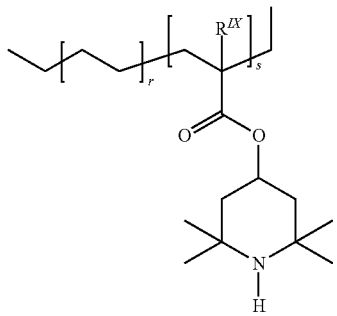

(9)

where $R^{IX}$=hydrogen or alkyl group and
r, s≧10,
are used.

These polymer-bound HALSs are 2,2,6,6-tetramethylpiperidin-4-one derivatives which are bound to or in a polymer chain. Suitable polymer chains are functionalized polyolefins, in particular copolymers based on ethylene and esters of (meth)acrylic acid and very particularly preferably copolymers based on ethylene and methacrylate. Particularly suitable examples of polymer-bound HALSs are disclosed in EP 0 063 544 A1 whose contents are hereby incorporated by reference into the present invention.

The stabilizers can be added to the starting materials mixture (A) and phenolic resin (B) in the apparatus, for example the extruder. In particular, the stabilizers are used in an amount of from 0.1 to 2% by weight, preferably from 0.2 to 1.5% by weight and particularly preferably from 0.3 to 1.2% by weight, based on the starting materials mixture (A) and phenolic resin (B), in the process of the invention.

Preference is given to adding both sterically hindered phenols, and HALSs to the starting materials in the process of the invention.

In a further embodiment of the process of the invention, the stabilizers and/or the antioxidants can be mixed into the reactive polymer afterwards in a downstream apparatus.

In the process of the invention, it is advantageous to add at least one deaerator to the starting materials mixture (A) and phenolic resin (B). As deaerator, it is possible to use, for example, silicone oils or silicone-modified polyglycols and polyethers, foam-destroying polysiloxanes or polymers, polyether-modified polymethylalkylsiloxanes, as are marketed, for example, by Byk under the trade names Byk®-A 506, Byk®-A 525, Byk®-A 530 or Byk®-A 535. The addition of a deaerator has the advantage that bubble formation both in the reactive polymer and also in the future material can be significantly reduced. The deaerator is preferably added in an amount of from 0.1 to 1% by weight, based on the starting materials mixture (A) and phenolic resin (B), preferably from 0.2 to 0.8% by weight and particularly preferably from 0.3 to 0.7% by weight.

A possible use of the reactive polymer of the invention is, for example, foams, in which case blowing agents instead of deaerators are preferably used in the preparation of the reactive polymer. As blowing agents, preference is given to using organic solvents, preferably methanol. These blowing agents are preferably added in an amount of from 0.5 to 5% by weight, based on the starting materials mixture (A) and phenolic resin (B).

Furthermore, it is advantageous to add at least one mould release agent to the starting materials mixture (A) and phenolic resin (B) in the process of the invention, as a result of which management of the process can be improved still further. The mould release agent preferably comprises
   silicones, for example in the form of oils, oil-in-water emulsions, fats and resins, waxes, for example natural and synthetic paraffins with and without functional groups,
   metal soaps or metal salts of fatty acids, for example calcium, lead, magnesium, aluminium and/or zinc stearate, fats,
   polymers, for example polyvinyl alcohol, polyesters and polyolefins,
   monoesters of phosphoric acid,
   fluorinated hydrocarbons and/or
   inorganic mould release agents, for example graphite, talc or mica powder.

As mould release agents, preference is given to using internal mould release agent systems which are added to the starting materials and either accumulate on the surface of the moulding or can bring about more rapid curing of the surface, so that no bond can be formed between the wall of the mould and the moulding. Mould release agents which are particularly suitable for the process of the invention are those from Acmos Chemie KG which are marketed under the trade names ACMOSAL® 82-837, ACMOSAL® 82-847, ACMOSAL® 82-860, ACMOSAL® 82-866, ACMOSAL® 82-9018, ACMOSAL® 82-853. The mould release agent is particularly preferably added in an amount of from 0.1 to 2% by weight, very particularly preferably from 0.2 to 1.5% by weight, to the starting materials mixture (A) and phenolic resin (B).

Furthermore, wetting agents, preferably surfactants, more preferably ethoxylated fatty alcohols or sodium laurylsulphate, can also be used in the process of the invention. The wetting agent is added in an amount of from 0.1 to 2% by weight, based on the starting materials mixture (A) and phenolic resin (B).

In addition, flame retardants such as halogenated organic compounds or organic phosphorus compounds can also be used in the process of the invention. Preference is given to using organic phosphorus compounds, in particular diphenyl cresyl phosphate or ammonium polyphosphates, for this purpose. The flame retardant is preferably added in an amount of from 1 to 30% by weight, more preferably from 2 to 15% by weight and particularly preferably from 5 to 10% by weight, to the starting materials mixture (A) and phenolic resin (B). Preference is given to using flame retardants from Clariant which are marketed under the trade names Exolit® AP, in particular Exolit® 263, Exolit® 442, Exolit® 454, Exolit® 455, Exolit® 470, Exolit® AP 420, Exolit® AP 422, Exolit® AP 423, Exolit® AP 462, Exolit® AP 740, Exolit® AP 751, Exolit® AP 760.

Apart from the abovementioned additives, it is also possible to use further additives or particulate components such as:
   thixotropes, for example pyrogenic silicas, preferably aerosils,
   fillers and pigments, for example titanium dioxide,
   nanoparticles, for example sheet silicates, in particular sodium lithium magnesium silicates as are marketed, for example, by Rockwood under the trade name Laponite® S482,
   coupling reagents, for example silanes, preferably N-cycloalkylaminoalkylalkyldialkoxysilanes, preferably N-cyclohexylaminomethyl-methyldiethoxysilane, marketed under the trade name Geniosil® XL 924 by Wacker Chemie AG, flexibilizers, for example glycols, low-profile additives, for example thermoplastics, preferably polyvinyl acetates as are marketed by Wacker Chemie AG under the trade name Vinnapas® B 60 sp, additives for increasing the electrical conductivity, for example calcium silicate, photoinitiators, preferably α-hydroxyketones, more preferably 2-hydroxy-2-methyl-1-propan-1-one, particularly preferably Darocure® 1173 from Ciba, light-absorbing additives, preferably 2,4-bis(2,4-dimethylphenyl)-6-(2-hydroxy-4-isooctyloxyphenyl)-1,3,5-triazines, for example CYASORB® UV-1164L from Cytec Industries Inc. and/or antistatics, in the process of the invention.

In a particularly preferred embodiment of the process of the invention, at least one deaerator, at least one stabilizer and at least one mould release agent are added to the starting materials mixture (A) and phenolic resin (B).

Furthermore, it is advantageous for reactive diluents to be additionally mixed in in the process of the invention. These are usually low molecular weight, ethylenically unsaturated compounds for reducing the viscosity. In general, they are acrylate- or methacrylate-containing materials which are liquid at room temperature and are therefore able to reduce the overall viscosity of the formulation. Examples of such products are, in particular, isobornyl acrylate, hydroxypropyl methacrylate, trimethylolpropane formal monoacrylate, tetrahydrofurfuryl acrylate, phenoxyethyl acrylate, trimethylenepropane triacrylate, dipropylene glycol diacrylate, tripropylene glycol diacrylate, hexanediol diacrylate, pentaerythrityl tetraacrylate, lauryl acrylate and also propoxylated or ethoxylated variants of these reactive diluents and/or urethanized reactive diluents such as EBECRYL® 1039 (Cytec) and others. Other liquid components which are able to react under conditions of free-radical polymerization, e.g. vinyl ethers or allyl ethers, are also possible. As an alternative, epoxy resins can be used as reactive diluents. The reactive diluents used for the purposes of the present invention are preferably Araldit® LY 1135-1 A resin (epoxy resin from Huntsman Advanced Materials (Europe) BVBA), the proportion of reactive diluents is from 0.1 to 20% by weight, preferably from 1 to 5% by weight, based on the starting materials mixture (A) and phenolic resin (B). The addition of reactive diluents has the advantage that the processing viscosity can be adjusted thereby.

The reactive polymer of the invention is characterized in that it comprises

I. a phenolic resin (B),

II. a mixture (A) comprising compounds having the structure (A1) and/or compounds having the structure (A2) and III. reaction product of the compounds having the structure (A1) and/or (A2) and the phenolic resin (B), with the reactive polymer containing at least 5% by weight of chemically unbound compounds having the structure (A1) and/or (A2), based on the reactive polymer. The expression "chemically unbound compounds" means that the compounds having the structure (A1) and/or (A2) have not reacted with the phenolic resin and are thus present in free form in the reactive polymer of the invention.

The proportion of chemically unbound compounds having the structure (A1) and/or (A2) is determined as follows (for example in the case of 1,3-phenylenebisoxazoline):

15 g of the sample (reactive polymer, for example as per Example 1) are placed in an extraction thimble and extracted with methanol under reflux for 18 hours. 1 ml of this methanolic solution is admixed with 10 ml of acetonitrile and 1 ml of HMDS (hexamethyldisilazane) to form the derivative and is heated at 100° C. for 1 hour. The sample is subsequently analysed by gas chromatography to determine the percent by area of 1,3-phenylenebisoxazoline.

To convert the percent by area into percent by weight, 1,3-phenylenebisoxazoline (purity: 99.8%) is used for calibration in the following manner:

168.5 mg of 1,3-phenylenebisoxazoline (purity: 99.8%) is admixed with 10 ml of acetonitrile and 1 ml of HMDS, heated at 100° C. for 1 hour and subsequently likewise analysed by gas chromatography.

The content of free 1,3-phenylenebisoxazoline in the reactive polymer can be calculated from the percent by area values for the extracted sample and the sample treated as standard, taking into account the weights used.

The content of chemically unbound compounds having the structure (A1) and/or (A2) in the reactive polymer of the invention is preferably at least 5% by weight, more preferably from 8 to 40% by weight, particularly preferably from 10 to 35% by weight, based on the reactive polymer.

The reactive polymer of the invention is preferably prepared by means of the process of the invention.

The reactive polymer of the invention preferably comprises compounds having the structures (A1) and/or (A2) in which the substituents of the type $R_1, R_2, R_3, R_4, R_5, R_6, R_7, R_n, R_m$ and $R_o$ are hydrogen and/or unsubstituted alkyl groups having from 1 to 6 carbon atoms and the structural fragment A is unsubstituted alkylene having from 1 to 6 carbon atoms or unsubstituted phenylene in the mixture (A). The reactive polymer of the invention preferably comprises compounds having the structures (A1) and/or (A2) where n, m, o=0 or 1.

In a preferred embodiment of the reactive polymer of the invention, the latter comprises a mixture (A) consisting of 100% by weight of one or more compounds having the structure (A2) in which m and o are preferably 0 or 1. In particular, it comprises compounds having the structure (A2) which have a phenylene group as structural fragment A, for example 1,3-phenylenebisoxazoline or 1,4-phenylenebisoxazoline. To set the properties of the reactive polymer in a targeted manner, the reactive polymer of the invention can comprise a mixture (A) comprising compounds having the structure (A2) where m≠o within the same compound (A2u) and/or compounds having the structure (A2) where m=o within the same compound (A2g).

Thus, for example, only compounds having m=1 and o=0 within the same compound (A2g) can be present in the mixture (A).

However, it can be advantageous for the reactive polymer of the invention to comprise a mixture (A) comprising both compounds having the structure (A2) where m and o=1 within the same compound (A2g6) and compounds having the structure (A2) where m and o=0 within the same compound (A2g5). In this way, the properties of the reactive polymer of the invention, for example the viscosity, the reactivity and the melting point, can be controlled. The reactive polymer of the invention preferably comprises 1,3-phenylenebisoxazoline or 1,4-phenylenebisoxazoline as compounds having the structure (A2g5).

The reactive polymer of the invention preferably comprises a mixture (A) comprising from 10 to 90% by weight of compounds of the structure (A2g6) and from 90 to 10% by weight of compounds of the structure (A2g5), particularly preferably
from 30 to 70% by weight of compounds of the structure (A2g6) and
from 70 to 30% by weight of compounds of the structure (A2g5)

and very particularly preferably
from 45 to 55% by weight of compounds of the structure (A2g6) and
from 55 to 45% by weight of compounds of the structure (A2g5).

The amounts indicated relate to the amounts of the starting materials used in the abovementioned process, and therefore encompass both the chemically bound and chemically unbound compounds in the reactive polymer of the invention.

The reactive polymer of the invention preferably comprises phenolic resins (B) obtained by condensation of phenols with aldehydes, in particular formaldehyde. Thus, this reactive polymer can comprise phenolic resins selected from the novolak and/or resol type. It particularly preferably comprises novolaks as phenolic resin (B).

Apart from the phenolic resin (B), the reactive polymer of the invention can also comprise polymers which are a reaction product of the compounds having the structures (A1) and/or (A2) and the phenolic resin (B).

The reactive polymer of the invention is preferably present in granulated or flaked form.

As a result of the preparative process, the reactive polymer of the invention can also contain a catalyst in the form of Lewis acids or Lewis bases, preferably trialkyl or triaryl phosphites and more preferably triphenyl phosphite. However, it can also comprise tetraalkylphosphonium or tetraarylphosphonium salts, tetraalkylammonium or tetraarylammonium salts of halides, tetrafluoroborate, hexafluorophosphate or para-toluenesulphonic acid.

The amount of catalyst in the reactive polymer of the invention is preferably from 0 to 2% by weight, based on the reactive polymer, more preferably from 0.01 to 1% by weight and particularly preferably from 0.01 to 0.4% by weight.

Depending on the use of the reactive polymer, it can be advantageous for no catalyst to be present in the reactive polymer of the invention. This is advisable particularly in the case of uses of the reactive polymer in which the loss in mass of the resulting material during a thermal treatment should be as low as possible.

The molecular weight distribution of the reactive polymer of the invention is preferably, as centrifuge average $M_c$, from 1000 to 4000 g/mol, more preferably from 1100 to 3000 and particularly preferably from 1200 to 2000, as weight average $M_w$ preferably from 500 to 2000, more preferably from 600 to 1500 and particularly preferably from 800 to 1300, and as number average $M_n$ from 400 to 800, more preferably from 450 to 750 and particularly preferably from 500 to 700. The molecular weight distribution is determined by means of gel permeation chromatography (GPC/DIN 55672-1; the eluent tetrahydrofuran contains 1% by weight of n-butylamine).

The viscosity of the reactive polymer of the invention (determined in accordance with DIN 53019-1) is preferably from 1000 to 10 000 mPa measured at 160° C., more preferably from 2000 to 8000 mPa and particularly preferably from 3000 to 7000 mPa.

The reactive polymer of the invention can comprise antioxidants, preferably sterically hindered phenols, more preferably compounds having the structure (3),

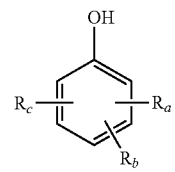

(3)

where $R_a$, $R_b$, $R_c$=hydrogen, alkyl, alkylaryl or cycloalkyl group, with the substituents of type $R_a$, $R_b$, $R_c$ being able to be identical or different and substituted or unsubstituted, for example the reaction product of 4-methylphenol with dicyclopentadiene and isobutene having the structure (4),

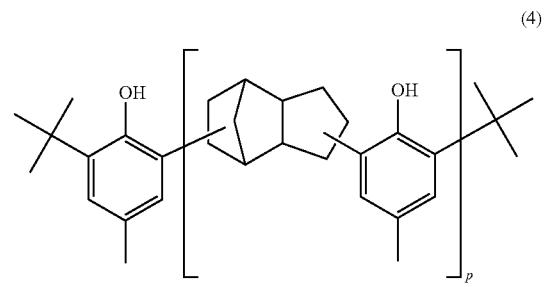

(4)

where p=1 to 5.

In particular, it contains these antioxidants in an amount of from 0.1 to 2% by weight, preferably from 0.2 to 1.5% by weight and particularly preferably from 0.3 to 1.2% by weight, based on the reactive polymer.

Furthermore, the reactive polymer of the invention can also comprise stabilizers, preferably HALSs (hindered amine light stabilizers), especially derivatives of 2,2,6,6-tetramethylpiperidin-4-one. This has the advantage that the long-term stability of the reactive polymer can be improved thereby.

The reactive polymer of the invention preferably comprises stabilizers having the structure (5)

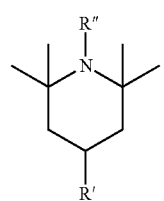

(5)

where R'=alkoxy group,

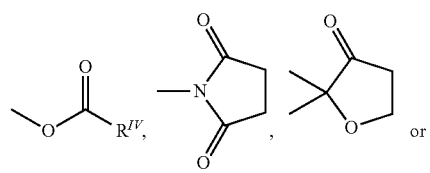

-continued

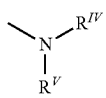

and

R'''=free oxygen radical (—O•), hydrogen, alkyl or alkoxy group,

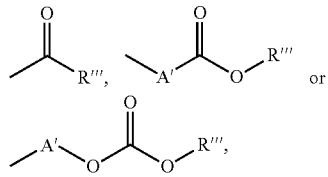

where R''' and $R^{IV}$=alkyl group, $R^V$=heterocycle and A'=alkylene group and the alkyl, alkoxy, alkylene groups and heterocycles are substituted or unsubstituted.

The reactive polymer of the invention particularly preferably comprises stabilizers having the following structures (6) to (8):

(6)

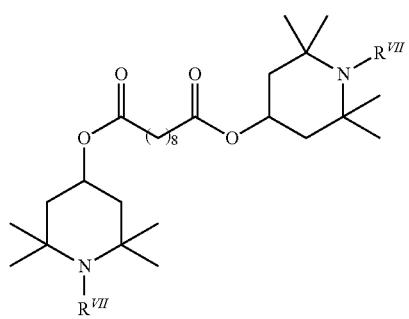

where $R^{VII}$=hydrogen, alkyl or alkoxy group, (7)

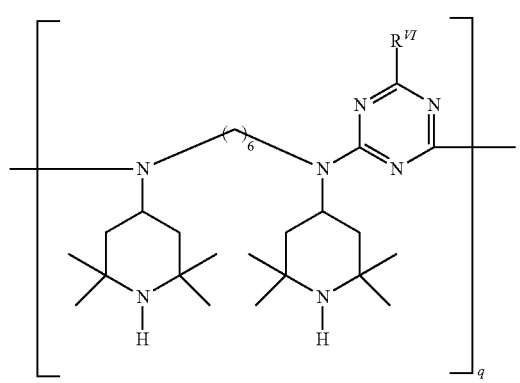

where $R^{VI}$=

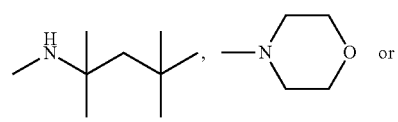

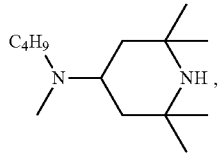

q=2 to 10, or (8)

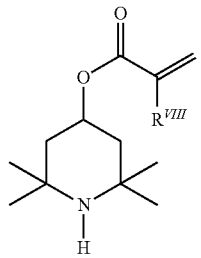

where $R^{VIII}$=hydrogen or alkyl group.

In a further embodiment of the reactive polymer of the invention, it comprises polymer-bound HALSs such as (9)

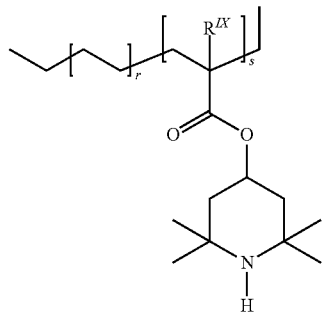

where $R^{IX}$=hydrogen or alkyl group and r, s≧10.

In particular, the reactive polymer of the invention contains the stabilizers in an amount of from 0.1 to 2% by weight, preferably from 0.2 to 1.5% by weight and particularly preferably from 0.3 to 1.2% by weight, based on the reactive polymer.

The reactive polymer of the invention preferably comprises both sterically hindered phenols and HALSs.

It is advantageous for the reactive polymer of the invention to comprise at least one deaerator, for example silicone oils or silicone-modified polyglycols and polyethers, foam-destroying polysiloxanes or polymers, polyether-modified polymethylalkylsiloxanes as are marketed, for example, by Byk under the trade names Byk®-A 506, Byk®-A 525, Byk®-A 530 or Byk®-A 535. The addition of a deaerator has the advantage that bubble formation can be significantly reduced both in the reactive polymer and in the future material. The reactive polymer preferably contains the deaerator in an amount of from 0.1 to 1% by weight, more preferably from 0.2 to 0.8% by weight and particularly preferably from 0.3 to 0.7% by weight, based on the reactive polymer.

A possible use of the reactive polymer of the invention is, for example, foams and the reactive polymer suitable for this purpose therefore preferably comprises blowing agents, preferably organic solvents, more preferably methanol, instead of the deaerator. These blowing agents are preferably present in the reactive polymer of the invention in an amount of from 0.5 to 5% by weight, based on the reactive polymer.

It is also advantageous for the reactive polymer of the invention to comprise at least one mould release agent, preferably

- silicones, for example in the form of oils, oil-in-water emulsions, fats and resins,
- waxes, for example natural and synthetic paraffins with and without functional groups,
- metal soaps or metal salts of fatty acids, for example calcium, lead, magnesium, aluminium and/or zinc stearate,
- fats,
- polymers, for example polyvinyl alcohol, polyesters and polyolefins,
- monoesters of phosphoric acid,
- fluorinated hydrocarbons and/or
- inorganic mould release agents, for example graphite, talc or mica powder.

As mould release agents, the reactive polymer of the invention preferably comprises internal mould release agent systems, in particular mould release agents from Acmos Chemie KG, which are marketed under the trade names ACMOSAL® 82-837, ACMOSAL® 82-847, ACMOSAL® 82-860, ACMOSAL® 82-866, ACMOSAL® 82-9018, ACMOSAL® 82-853. The reactive polymer preferably contains the mould release agent in an amount of from 0.1 to 2% by weight and particularly preferably from 0.2 to 1.5% by weight, based on the reactive polymer.

Furthermore, the reactive polymer of the invention can also comprise wetting agents, for example surfactants, preferably ethoxylated fatty alcohols or sodium laurylsulphate, particularly preferably in an amount of from 0.1 to 2% by weight, based on the reactive polymer of the invention.

In addition, the reactive polymer of the invention can also comprise flame retardants such as halogenated organic compounds or organic phosphorus compounds. It preferably comprises organic phosphorus compounds, in particular diphenyl cresyl phosphate or ammonium polyphosphates, as flame retardants. The amount of the flame retardant is preferably from 1 to 30% by weight, more preferably from 2 to 15% by weight and particularly preferably from 5 to 10% by weight, based on the reactive polymer. Preference is given to flame retardants from Clariant which are marketed under the trade names Exolit® AP, in particular Exolit® 263, Exolit® 442, Exolit® 454, Exolit® 455, Exolit® 470, Exolit® AP 420, Exolit® AP 422, Exolit® AP 423, Exolit® AP 462, Exolit® AP 740, Exolit® AP 751, Exolit® AP 760, being present.

Apart from the abovementioned additives, the reactive polymer of the invention can also comprise further additives or particulate components, for example:

- thixotropes, for example pyrogenic silicas, preferably aerosils,
- fillers and pigments, for example titanium dioxide,
- nanoparticles, for example sheet silicates, in particular sodium lithium magnesium silicates as are marketed, for example, by Rockwood under the trade name Laponite® S482,
- coupling reagents, for example silanes, preferably N-cycloalkylaminoalkylalkyldialkoxysilanes, preferably N-cyclohexylaminomethyl-methyldiethoxysilane, marketed under the trade name Geniosil® XL 924 by Wacker Chemie AG,
- flexibilizers, for example glycols,
- low-profile additives, for example thermoplastics, preferably polyvinyl acetates as are marketed by Wacker Chemie AG under the trade name Vinnapas® B 60 sp,
- additives for increasing the electrical conductivity, for example calcium silicate,
- photoinitiators, preferably α-hydroxyketones, more preferably 2-hydroxy-2-methyl-1-propan-1-one, particularly preferably Darocure® 1173 from Ciba,
- light-absorbing additives, for example 2,4-bis(2,4-dimethylphenyl)-6-(2-hydroxy-4-isooctyloxyphenyl)-1,3,5-triazines, for example CYASORB® UV-1164L from Cytec Industries Inc. and/or
- antistatics.

In a further preferred embodiment, the reactive polymer additionally comprises a reactive diluent. Suitable reactive diluents have been described above in the description of the process. The proportion of the reactive diluents is from 0.1 to 20% by weight, preferably from 1 to 5% by weight and in particular from 1 to 5% by weight, based on the reactive polymer. The addition of the reactive diluents enables the viscosity of the reactive polymer to be adjusted. The reactive diluent firstly brings about a decrease in viscosity after complete mixing of the starting materials, which can be advantageous in particular applications, and at the commencement of thermal curing the reactive diluent brings about an increase in the viscosity, without the final properties of the polymer being influenced.

In a particularly preferred embodiment of the reactive polymer of the invention, it comprises at least one deaerator, at least one stabilizer and at least one mould release agent.

The present invention further provides for the use of the reactive polymer of the invention for producing materials, in particular composites, particularly preferably fibre composites. Apart from the use for producing composites, the reactive polymer of the invention can also be used for producing plastics. These plastics produced preferably have a glass transition temperature $T_g$ of at least 190° C. and more preferably at least 200° C., and these materials are preferably formaldehyde-free.

Depending on the type of use, the reactive polymer of the invention can firstly be dissolved in a customary solvent, in particular ketones.

In the use according to the invention of the above-described reactive polymer, it is possible to use inorganic reinforcing fibres, for example glass fibres, organic reinforcing fibres, for example aramid fibres or carbon fibres, metallic reinforcing fibres or natural fibres. The reinforcing fibres can here be used in the form of woven fabrics, lay-ups, multiaxial lay-ups, nonwovens, knitteds, braids or mats.

The above-described reactive polymer is used as matrix in the use according to the invention. Thus, this reactive polymer can be used, for example, for producing preimpregnated semifinished parts, for example sheet moulding compound (SMC) or bulk moulding compound (BMC). Preforming can likewise be used for producing the semifinished part in the use according to the invention.

The processing of this reactive polymer with reinforcing materials to produce composites can be carried out by means of many processes/technologies according to the prior art. In particular, the composites are produced by means of one of the technologies listed below:

- lamination or manual lamination,
- prepreg technology, resin transfer moulding (RTM),
infusion processes such as resin infusion moulding (RIM) or the Seeman composites resin infusion process (SCRIMP),
winding processes,
pultrusion processes or
fibre laying processes.

The curing of this reactive polymer in the use according to the invention can be brought about by introduction of heat, for example in an oven, in an autoclave or in a press, or else by means of microwaves.

The composites produced by the use according to the invention can be used, in particular, in the aircraft industry, the transport industry, for example the automobile industry, and in the electrical industry. These composites can also be used in wind power plants, pipes or containers in the form of tanks or pressure vessels.

The reactive polymer can also be used for producing lightweight structures, in particular in combination with multilayer constructions such as honeycombs or foams based on phenolic resin, polyimide, glass, polyurethane, polyamide or polyvinyl chloride.

The use of the reactive polymer in materials leads, in particular, to components having a high heat distortion resistance and a high glass transition temperature $T_g$. The high toughness and resilience of this reactive polymer, which leads to improved impact properties, is also advantageous.

Further fields of application for the reactive polymer or the materials resulting therefrom are, for example, as abrasives, refractory products, in the foundry industry, as battery separators, in pressure and injection moulding, mineral wool (including wool made of glass, rock or basalt (formaldehyde-free)), for paper impregnation, in laminates based on glass or paper for electrical insulation, for the production of foams, coating of glass or metal, for example as cable coating, rubber mixtures as replacement for novolak as separate phase and coreactant with other monomers for thermosets, for example bismaleimide.

The following examples are intended to illustrate in greater detail the process of the invention for preparing reactive polymers, without the invention being restricted to these embodiments.

EXAMPLE 1

Two streams were employed. Stream 1 consisted of a mixture of 50.7% by weight of a phenolic resin (Durez® 33100 from Sumitomo-Bakelite) and 49.3% by weight of 1,3-phenylenebisoxazoline and stream 2 consisted of triphenylphosphite (0.98% by weight of triphenyl phosphite based on the total formulation).

The extruder used, viz. a twin-screw extruder model DSE25 (Brabender GmbH), comprised eight barrel sections which could be heated and cooled separately. Thus, the set temperature in barrel section 1 was 30° C., that in barrel section 2 was 100° C., that in barrel sections 3-7 was 180° C. and that in barrel section 8 and the head section was 160° C. The temperatures were regulated by means of electric heating or water cooling. The rotational speed of the screw was 280 rpm.

Stream 1 was fed as a powder mixture in an amount of 3.00 kg/h into barrel section 1 of the extruder, while stream 2 was fed into barrel section 3 of the extruder in an amount of 29.6 g/h, with the stream being at room temperature.

The melt leaving the extruder was conveyed through a cooling bath and subsequently milled. Characterization was carried out on the solidified melt of the reactive polymer:

Determination of the Glass Transition Temperature $T_g$

The glass transition temperature was determined by means of differential scanning calorimetry (DSC) in accordance with DIN 53765, and the conditioning of the sample was carried out as follows:

heating from room temperature to 150° C. and holding for one hour,
cooling to room temperature,
heating to 250° C. and holding for two hours,
cooling to room temperature,
heating to 300° C.—no hold time.

Determination of the Hydroxyl Number

The hydroxyl number is the amount of potassium hydroxide in milligrams which is equivalent to the amount of acetic acid bound in the acetylation of 1 g of substance.

Blank Determination (Duplicate Determination)

10 ml of acetylation solution (acetic anhydride—10% in tetrahydrofuran) and 30 ml of catalyst solution (4-N-dimethylaminopyridine—1% in tetrahydrofuran) are placed in a 100 ml conical flask, closed by means of a stopper and stirred at room temperature for 30 minutes. 3 ml of water are subsequently added and the mixture is stirred for another 30 minutes. This mixture is poured into the Titrino beaker and the conical flask is rinsed using about 4 ml of tetrahydrofuran, followed by titration (Titrino Basic 794 using an LL Solvotrode 6.0229.100 electrode for nonaqueous media).

Hydroxyl Number Determination of the Sample

The sample (about 1 g) is weighed into a 100 ml conical flask and dissolved by means of 10 ml of acetylation solution while stirring over a period of about 5 minutes. 30 ml of catalyst solution are subsequently added and the mixture is stirred at room temperature for 30 minutes. 3 ml of deionized water are then added and the mixture is stirred for a further 30 minutes. This mixture is placed in the Titrino beaker and the conical flask is rinsed using about 4 ml of tetrahydrofuran, followed by titration of the sample. The equivalence point is at about 200 mV in the case of the instrument used, and in the case of samples containing phenolic resin, a plurality of end points can occur.

Calculation of the Hydroxyl Number $$\text{Hydroxyl number} = ((B-A) \times C \times 56.1)/W + AN$$

where

A is the consumption of KOH solution (0.5N potassium hydroxide in ethanol) in the titration of the sample, in ml B is the consumption of KOH solution for the blank, in ml C is the concentration of the KOH solution in mol/l W is the weight of sample in g AN is the acid number of the sample in mg KOH/g Determination of the Acid Number by Separate Determination From 1.5 to 2 g are dissolved in 20 ml of dimethylformamide (DMF), admixed with 80 ml of isopropanol and subsequently titrated in accordance with DIN EN 12634.

The hydroxyl number is 249 mg KOH/g.

The viscosity was determined by means of a cone-and-plate viscometer (DIN 53019-1) and is 4365 mPas/160° C.

Characterization of the Cured Reactive Polymer:

The glass transition temperature $T_g$ is 202° C. (DIN 53765).

EXAMPLE 2

The test specimens are produced using a matrix resin in combination with a woven carbon fibre fabric from ECC, Style 452, in accordance with ISO 1268 and tensile testing was carried out in accordance with DIN EN ISO 14129. Various polymer compositions were used as matrix resin:
(a) reactive polymer as described in Example 1
(b) phenolic resin
(c) cyanate ester resin
(d) epoxy resin (laminating resin Larit® L 305 from Lange+Ritter GmbH)

The reactive polymer as described in Example 1 displays a higher tensile deformation compared to the prior art (samples (b) to (d)).

EXAMPLE 3

14.05 g of 1,2-phenylenebisoxazoline, 13.66 g of phenolic resin Durez® 33100 and 0.28 g of triphenylphosphite are mixed in a Brabender kneading chamber at 164-167° C. and 50 rpm for 12 minutes. Part of the Brabender kneading output is conditioned in a reagent bottle in an oil bath for 4 h/250° C. (so as to cure the reactive polymer). This material is subsequently subjected to an isothermal TGA (DIN 51006) for 4 h/360° C. The loss in mass is 27.6%.

EXAMPLE 4

14.0 g of 1,2-phenylenebisoxazoline, 13.6 g of phenolic resin Durez® 33100, 0.28 g of triphenylphosphite, 0.07 g of RALOX® LC and 0.14 g of CYASORB® UV-3346 light stabilizer are mixed in a Brabender kneading chamber at 160° C. and 50 rpm for 7 minutes. Part of the Brabender kneading output is conditioned in a reagent bottle in an oil bath for 4 h/250° C. (so as to cure the reactive polymer). This material is subsequently subjected to an isothermal TGA (DIN 51006) for 4 h/360° C. The loss in mass is 24.9%.

EXAMPLE 5

A reactive polymer as described in Example 1 was produced with addition of 0.5% by weight of CYASORB® UV-3346 light stabilizer and 0.25% by weight of RALOX® LC. Measurement of the viscosity (cone-and-plate viscometer in accordance with DIN 53019-1) after 300 s at 160° C. gave a value of 1808 mPas.

EXAMPLE 6

95 parts by weight of the reactive polymer as described in Example 5 are mixed with 5 parts by weight of ARALDIT® LY 1135-1 A resin. Measurement of the viscosity (cone-and-plate viscometer in accordance with DIN 53019-1) after 300 s at 160° C. gave a value of 11942 mPas. The processing viscosity can thus be influenced in a targeted manner by addition of epoxy resin.

The invention claimed is:

1. A process for continuously preparing a reactive polymer, the process comprising:
reacting a mixture (A) comprising one or more compounds having structure (A1)

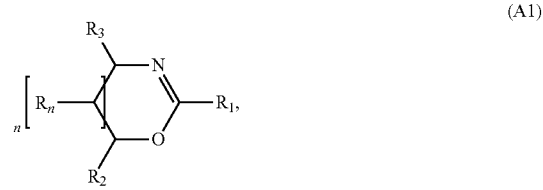

wherein $R_1$=alkyl or phenyl group,
$R_2$, $R_3$, $R_n$=hydrogen or alkyl group, and
n=0, 1, 2, or 3;
or
one or more compounds having structure (A2)

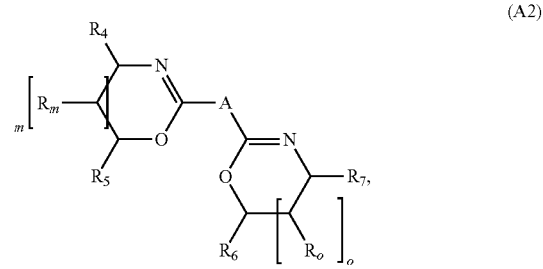

wherein A=alkylene or phenylene,
$R_4$, $R_5$, $R_6$, $R_7$, $R_m$, $R_o$=hydrogen or alkyl group, and
m, o=0, 1, 2, or 3;
or
mixtures of one or more compounds having the structure (A1) and (A2),
wherein $R_1$, $R_2$, $R_3$, $R_4$, $R_5$, $R_6$, $R_7$, $R_n$, $R_m$, and $R_o$ can be identical or different and substituted or unsubstituted,
A can be substituted or unsubstituted, and
m and o can be identical or different,
with phenolic resins (B),
in an extruder, flow tube, intensive kneader, intensive mixer, or static mixer, by mixing and reaction with introduction of heat, and
subsequently isolating an end product,
wherein a residence time of starting materials, which are mixture (A) and phenolic resin (B), in the extruder, flow tube, intensive kneader, intensive mixer, or static mixer, is from 3 seconds to 15 minutes, and
reactants are reacted at a temperature of from 150° C. to 200° C., and then rapid cooling is carried out, with the temperature decreasing by more than 50° C. within less than 60 seconds.

2. The process according to claim 1, wherein the residence time of the starting materials in the extruder, flow tube, intensive kneader, intensive mixer, or static mixer, is from 3 seconds to 5 minutes.

3. The process according to claim 1, wherein the reacting is carried out in the extruder and the extruder is a twin-screw extruder.

4. The process according to claim 1, wherein the mixture (A) consists of 100% by weight of the one or more compounds having the structure (A2).

5. The process according to claim 1, wherein the mixture (A) comprises compounds having the structure (A2), in which m≠o within a single compound (A2u), and/or compounds having the structure (A2), in which m=o within a single compound (A2g).

6. The process according to claim 5, wherein the mixture (A) comprises both compounds having the structure (A2), in which m and o=1 within a single compound (A2g6), and compounds having the structure (A2), in which m and o=0 within a single compound (A2g5).

7. The process according to claim 6, wherein mixture (A) comprises
from 30 to 70% by weight of compounds of structure (A2g6) and
from 70 to 30% by weight of compounds of structure (A2g5).

8. The process according to claim 1, wherein at least one derivative of 2,2,6,6-tetramethylpiperidin-4-one is added as stabilizer in the reacting.

9. The process according to claim 8, wherein the at least one derivative has a structure:

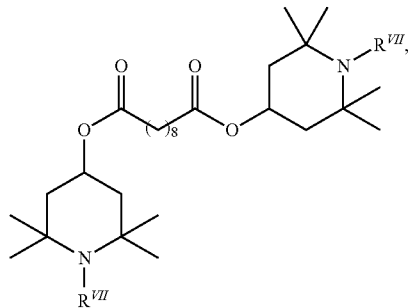

(6)

wherein $R^{VII}$=hydrogen, alkyl, or alkoxy group, or

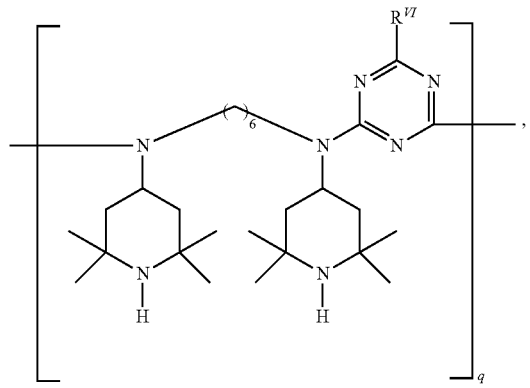

(7)

wherein

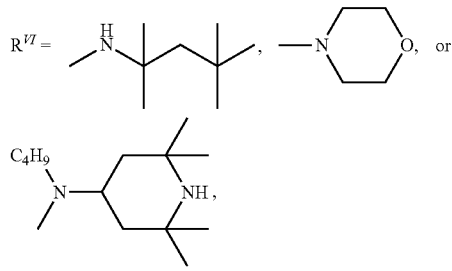

and
q=2 to 10,
or

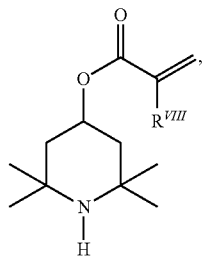

(8)

wherein $R^{VIII}$=hydrogen or alkyl group.

10. The process according to claim 8, wherein the at least one derivative is a polymer-bound HALS.

11. The process according to claim 8, wherein the at least one derivative is present in an amount of from 0.1 to 2% by weight based on the starting materials, mixture (A) and phenolic resin (B).

12. The process according to claim 1, wherein at least one antioxidant having structure (6)

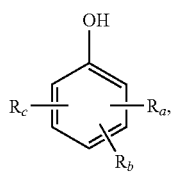

(6)

wherein $R_a$, $R_b$, $R_c$=hydrogen, alkyl, alkylaryl, or cycloalkyl group, an $R_a$, $R_b$, $R_c$ can be identical or different and substituted or unsubstituted, added in the reacting.

13. The process according to claim 1, wherein at least one antioxidant having structure (7),

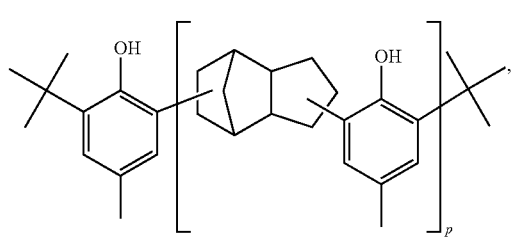

(7)

wherein p=1 to 5,
is added in the reacting.

14. The process according to claim 1, wherein at least one deaerator is added to the starting materials, mixture (A) and phenolic resin (B), in the reacting.

15. The process according to claim 14, wherein the at least one deaerator is selected from the group consisting of silicone oil, a silicone-modified polyglycol, a polyether, foam-destroying polysiloxane, a foam destroying polymer, and a polyether-modified polymethylalkylsiloxane.

16. The process according to claim 1, wherein at least one mold release agent is added to the starting materials, mixture (A) and phenolic resin (B), in the reacting.

17. The process according to claim 4, wherein m and o are 0 or 1.

18. The process according to claim 2, wherein the reacting is carried out in the extruder and the extruder is a twin-screw extruder.

19. The process according to claim 2, wherein the mixture (A) consists of 100% by weight of the one or more compounds having the structure (A2).

20. The process according to claim 3, wherein the mixture (A) consists of 100% by weight of the one or more compounds having the structure (A2).

* * * * *